May 27, 1924.　　　　　　　　　　　　　　　　　　1,495,879
F. BONNET
MACHINE FOR MOLDING CONCRETE AND THE LIKE BLOCKS
Filed Sept. 24, 1920　　　5 Sheets-Sheet 1

Inventor:
François Bonnet
By [signature]
Attorney

May 27, 1924.

F. BONNET 1,495,879

MACHINE FOR MOLDING CONCRETE AND THE LIKE BLOCKS

Filed Sept. 24, 1920   5 Sheets-Sheet 2

Inventor:
François Bonnet
By
Attorney

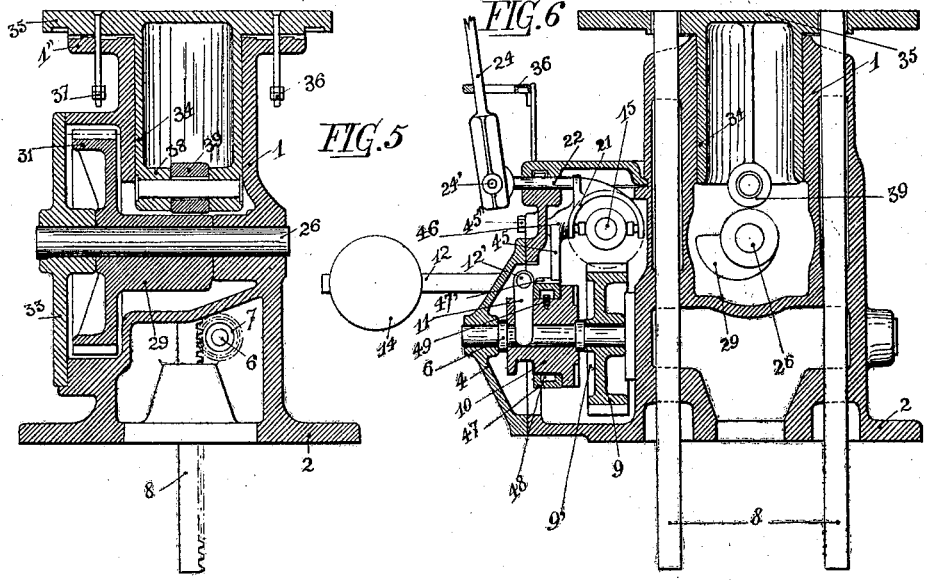
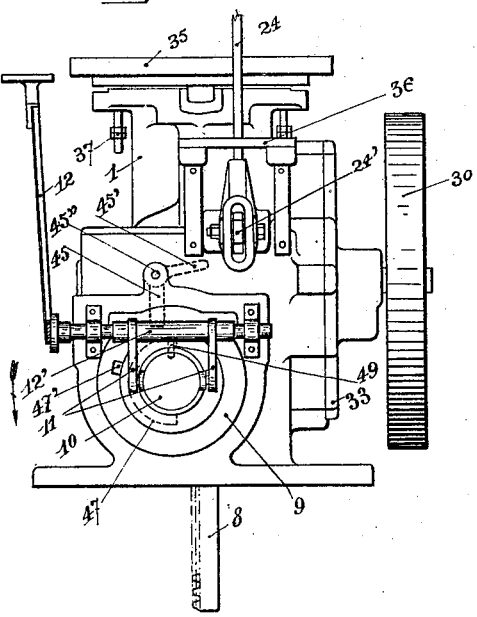
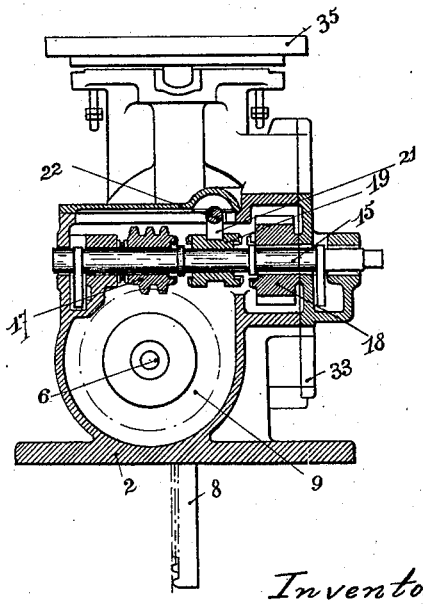

May 27, 1924.

F. BONNET

MACHINE FOR MOLDING CONCRETE AND THE LIKE BLOCKS

Filed Sept. 24, 1920    5 Sheets-Sheet 4

1,495,879

Inventor
François Bonnet
By
Attorney.

May 27, 1924.
F. BONNET
1,495,879
MACHINE FOR MOLDING CONCRETE AND THE LIKE BLOCKS
Filed Sept. 24, 1920  5 Sheets-Sheet 5
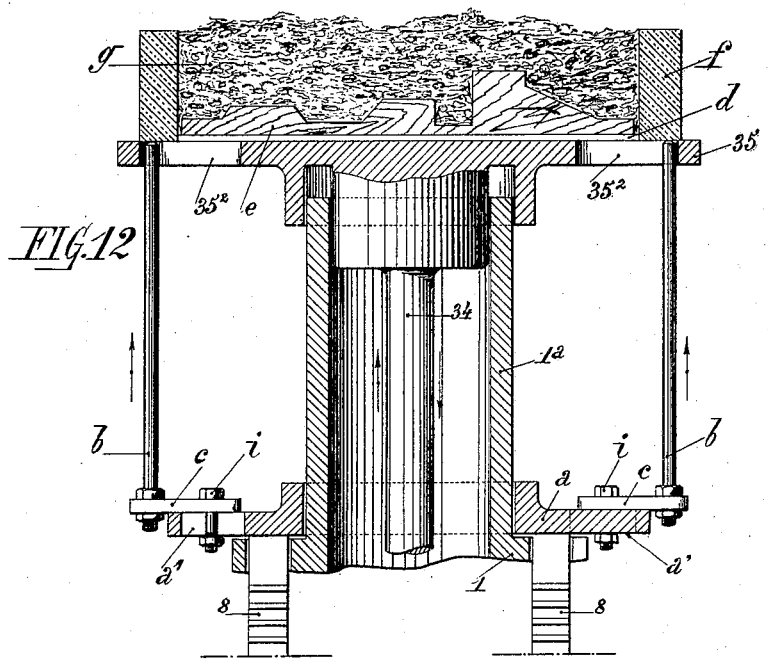
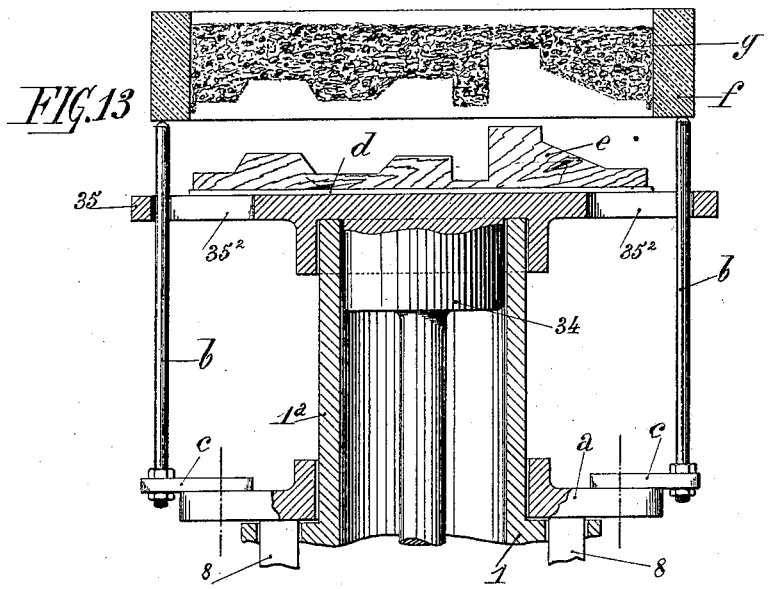
Inventor:
François Bonnet
By
Attorney Patented May 27, 1924.

1,495,879

UNITED STATES PATENT OFFICE.

FRANÇOIS BONNET, OF VILLEFRANCHE-SUR-SAONE, FRANCE.

MACHINE FOR MOLDING CONCRETE AND THE LIKE BLOCKS.

Application filed September 24, 1920. Serial No. 412,501.

*To all whom it may concern:*

Be it known that I, FRANÇOIS BONNET, a citizen of the French Republic, and residing at Rue Grenette, Villefranche-sur-Saone, Rhone, France, have invented certain new and useful Improvements in Machines for Molding Concrete and the like Blocks, of which the following is a specification.

This invention relates to improvements in machines for molding concrete and the like blocks of the kind wherein a cam raises a piston supporting the mould and allows it to fall back suddenly, producing a shock or violent concussion at each rotation of the cam which causes gradual and uniform compression of the entire mass contained in the mould.

The annexed drawings illustrate the invention.

Fig. 1 is a side elevation.

Fig. 2 is a section on line A—A of Fig. 1.

Fig. 3 is a vertical section on line B—B of Fig. 1 and

Fig. 4 is a section on line C—C of Fig. 2.

Figs. 5 to 11 show in a smaller scale a modified construction of the machine in which;

Fig. 5 is a vertical section through the axle of the cam shaft and of the mould carrying piston.

Fig. 6 is also a vertical section, but in a plane at right angles to that of Fig. 5.

Fig. 7 is an outer view in elevation of the side comprising the working lever, the bottom 4 being removed.

Figure 9:
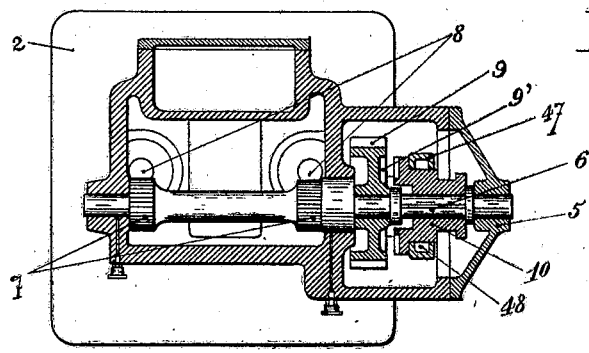
Figure 10:
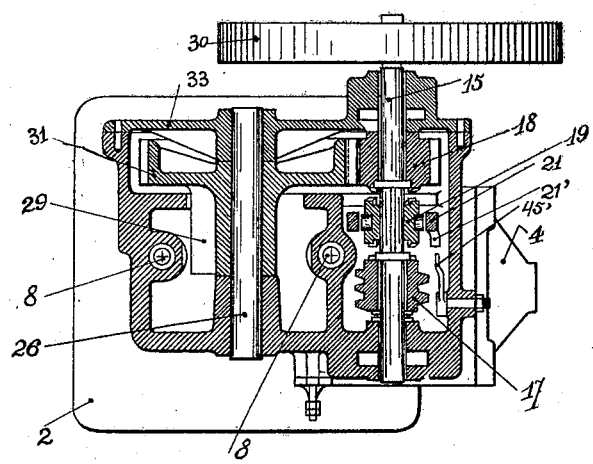
Figure 11:
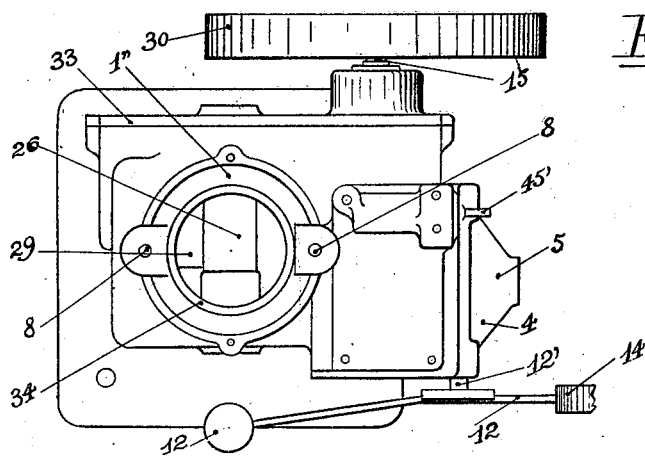

Fig. 8 is a vertical section through the axis of the motor shaft. Fig. 9 is a horizontal section through the axis of the shaft carrying the pinions gearing with the racks; Fig. 10 is also a horizontal section but through the axis of the motor shaft; Fig. 11 is a plan view of the whole of the machine, the mould cylinder being removed.

Figs. 12 and 13 are detail sections illustrating the application of the machine for making foundry moulds.

Figure 1:
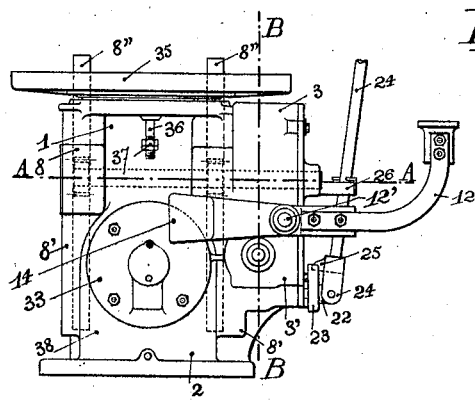
Figs. 1 to 4 illustrate one form of construction of the machine of which—
Figure 2:
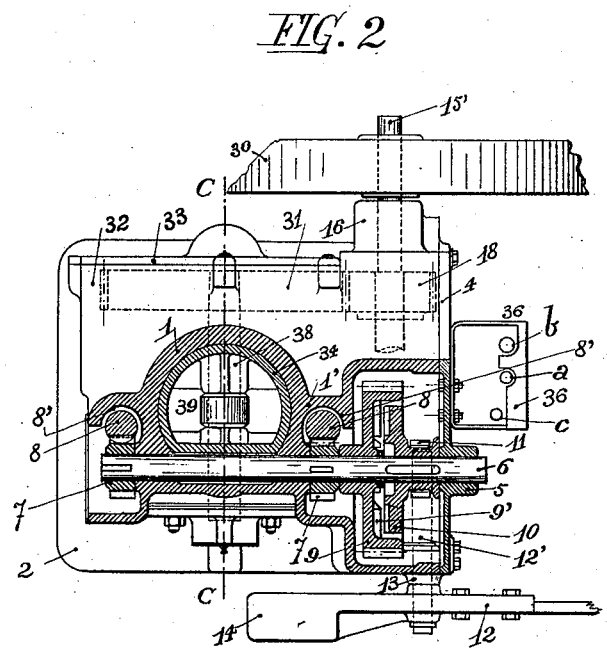

The machine shown in Figs. 1 to 4 comprises a cylinder 1 cast with a base 2 and a casing 3, $3^1$ intended to enclose coupling and uncoupling mechanism, and the casing 38 enclosing a toothed wheel. The casing 3, $3^1$ is closed by an end plate 4 which is secured by means of screws and is provided with a boss 5 forming a bearing for one of the ends of an elevating shaft 6 which passes almost tangentially through the walls of the cylinder 1, as shown in Fig. 2. At the intersection of the shaft 6 with these walls bearings 1' are formed for said shaft and also serve as abutments to two pinions 7, 7 keyed on the said shaft 6 and engaging with two vertical racks 8, 8, sliding in suitable housings $8^1$ formed in the walls of the cylinder 1. On the part of the shaft 6 extending into the cylindrical upper part 3 of the casing is loosely mounted a helicoidally toothed wheel 9, recessed on one surface and having in said recess a toothed crown $9^1$ with which can engage a toothed sleeve 10 keyed on the shaft 6 and slidable thereon by the action of a fork 11 embracing a collar of the sleeve. This fork is attached at the end of the shaft $12^1$ of a pedal 12 mounted outside the machine. This shaft can rotate in a bearing 13 formed in the wall of the casing 3, Fig. 3, and it has at the end a square member on which is mounted a lever of the pedal which is provided with a counter-weight 14.

A shaft 15 extends lengthwise through the rectangular part $3^1$ of the casing and is supported in two bearings 16 provided at the ends of said part $3^1$. On this shaft are mounted a worm 17 engaging with the wheel 9 and a straight toothed pinion 18. These two members 17, 18 have on their facing surfaces claws $17^1$ and $18^1$. This shaft 15 is the motor shaft and for this purpose carries a flywheel-pulley 30 receiving its movement from a suitable transmitter. Between these two members is keyed on the shaft a double clutch sleeve 19 having an annular groove engaged by a fork 20 on which is articulated the end of a small connecting rod 21 of which the other end is provided with a shaft 22 which passes through a suitable bearing in the plate 4. The part of this axle shaft which extends through the plate 4 forms a perpendicular lug 23 split at the end and to which is articulated an operating lever 24 comprising a finger 25 which engages in the slit of the lug 23. This lever is of a suitable length and extends through a cage 36 fastened to the plate 4 and of which the inner surface parallel with said plate has notches corresponding to the positions, $a$, $b$, $c$ which said lever is to assume in order to govern the various operations of the machine.

Parallel with the motor-shaft 15 the machine further comprises a shaft 26 situated below the cylinder 1 and intersecting the axis of the latter at right angles. It is supported in two bearings, one of which 27 is cast with the cylinder and the base, whilst the other $27^1$ is integral with a cap 28 closing an opening $28^1$ provided in the base for the purpose of allowing the mounting of the said shaft and of the cam 29 keyed on said shaft between the two bearings 27, $27^1$. The said shaft carries at the end a toothed wheel 31 which meshes with the pinion 18 and housed in a casing 32 formed by the base and closed by a plate 33.

In the cylinder 1 is housed a piston 34 of which the upper part is greater than the width of the cylinder and forms a plate 35 intended to receive the various shapes and sizes of the moulds used. The rim of this plate carries three equi-distant rods $36^1$ which pass through the collar $1^{11}$ at the top of the cylinder, these rods are fastened by one end to the plate and the opposite screw-threaded end receives a nut and counter-nut 37, the position of which is regulated in order to allow of the alternate rising and falling movement of the piston, but so as to prevent the accidental traction of the latter at the ejection of the manufactured block.

Figure 4:
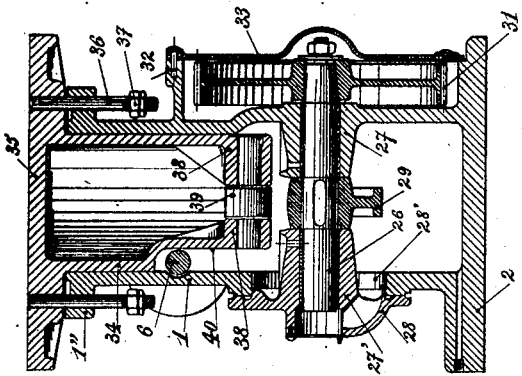

The lower portion of this piston forms two bearings 38 through which passes a stationary shaft $39^1$ and on which revolves loosely a roller 39 placed between the two bearings and immediately above the cam 29 and in the same vertical axis, Fig. 4.

The piston 34 has a recess 40 on the surface of its lower portion; this recess has such shape and dimensions so that the alternating movement of said piston may take place without being affected by the presence of the shaft 6 controlling the racks 8.

The upper ends of these racks pass through the plate 35 and extend at $8^{11}$ a little beyond the surface of said plate, these projections $8^{11}$ are intended to enter into two cavities provided in the underside of the movable bottom of the mould employed, it being explained that the body of said mould is fixed to the plate. Neither the mould nor its movable bottom are illustrated.

Any type of mould with a vertically movable bottom can be employed.

The working of the machine is as follows:—

Figure 3:
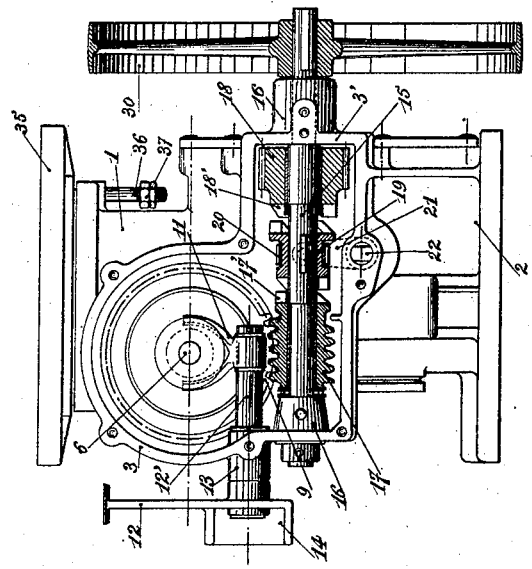

The racks 8 being at the bottom of their course, the movable bottom of the mould is supported by them direct, whilst the body of the mould is integral with the plate 35 which forms the top of the piston 34. The operator places the working lever 24 in the notch $a$ of the cage 36 which places and maintains the coupling sleeve 19 out of engagement with the clutch wheels $17^1$ and $18^1$ as shown in Fig. 3 whereby the motor shaft 15 rotates freely and does not drive any member.

At this moment the mould is filled with the materials to be agglomerated; and when this filling is terminated, the operator actuates the lever 24 and places it in the notch $b$ of the cage. The movement of the lever produces the movement in the same direction, of the connecting rod 21 and consequently causes the sliding of the sleeve 19 on the shaft 15 in the direction of the pinion 18 with the claws of which the corresponding claws of the sleeve 19 come into engagement.

The pinion 18 thus becomes clutched with the shaft 15 and is driven thereby at the same speed, and drives the shaft 26 through the toothed wheel 31 at a lower speed than that of the pinion 18. The result is that the cam 29 revolves with the shaft 26 and that at each revolution it lifts the piston 34 by acting on the roller 39 and said piston drops suddenly as soon as the nose of the cam quits the roller. There is consequently produced a series of consecutive and closely following falls of the piston, which effects the gradual settling up of the materials contained in the mould and their proportional compression throughout the whole mass.

When this compression is judged to be sufficient, the operator disengages the lever 24 from the notch $b$ and brings it to the furthest opposite point of the cage 26 indicated by the letter $c$. There is no notch at this position in order to force the operator to hold the lever in his hand until the end of the operation.

This displacement of the lever in inverse direction to the former produces the sliding of the sleeve 19 in the direction of the worm 17. This sleeve leaves the pinion 18 and enters into engagement with the claws $17^1$ of the endless screw. The cam 29 and the piston remain immovable while the helicoidal toothed wheel 9 is driven by the worm 17.

As the counterweight 14 always draws the shaft $12^1$ of the pedal 12 from right to left, the clutch sleeve 10 is thereby kept applied against the claws $9^1$ and thus renders the wheel 9 integral with the shaft 6. Consequently the shaft starts to rotate in the desired direction in order that the pinions 7 which constantly gear with the racks 8, produce the ascent of the latter which slide in their housings and lift the bottom of the mould within the walls of the latter. The moulded and compressed block which is supported by said bottom, rises gradually out of the mould and when the bottom has reached or rather passed beyond the top edge of the mould, the operator presses with his foot on the pedal 12, in order to rock it and instantaneously produce the return movement of the sleeve 10 which causes the uncoupling of the wheel 9, which can rotate loosely on its shaft. The movement of the racks stop and the moulded block remains in the position which it occupies. At this instant the operator pushes the lever 24 back into the notch $a$, position allowing free movement of the motor shaft, then he releases the pedal.

The block is then removed with the bottom which supports it, then a new bottom is put in the place of the former one. The shaft 6 is then put in motion in the reverse direction to the former by a reversing device for the motor shaft, which device is not illustrated but may be of any known construction. The racks then descend again to their lowest position, it being understood that the worm had been previously coupled.

When the racks are at the end of the stroke, the shaft 15 is again started in the forward working, then the sleeve 19 is placed at the dead point, Fig. 3 during the time required for filling the mould and the described operations are repeated.

In the modified construction shown in Figs. 5 to 11 the members which perform the same function as those of the machine described with reference to Figs. 1 to 4 are designated by the same reference characters and the new members bear different numerals.

This construction comprises the base 2 surmounted by the cylinder 1 in which moves the piston 34 of which the bottom 38 is provided with the roller 39. The cam 29 is however not keyed on the shaft 26 but is cast in one piece with the toothed wheel 31 and these two members rotate freely on the shaft 26 which is supported at one end in a bearing formed on the base 2 and at the other end in a bearing formed by the central part of the plate 33 closing the casing 32.

The shaft 6 is still perpendicular to the motor shaft 15, but it is now below the latter, which allows the recess 40 in the piston 34 to be suppressed. The pinions 7 intended to control the racks 8 are integral with this shaft 6, which rotates in two bearings formed, one by the base, the other by boss 5 of the plate 4 of the casing $3^1$. This plate is shaped like a truncated cone in order to permit housing the toothed sleeve 10 keyed on the said shaft 6 and permitted to slide thereon.

The helicoidal toothed wheel 9 loose on the shaft 6 still has the crown $9^1$ with which the sleeve 10 can engage. A ring 47 is mounted on the periphery of this sleeve in such manner that it cannot be separated therefrom but can rotate thereon in order to be driven only at a given moment. This result is obtained by a groove 48 extending only over a certain portion of the inner circumference of this ring and by a pin 49 which is arranged at a point of the outer surface of the sleeve 10 and housed in said groove. This ring comprises a catch at one point of its periphery which is determined in accordance with the situation of the portion of groove 48 and of the pin 49.

The toothed sleeve 10 is, as formerly, placed in engagement with the crown wheel $9^1$ of the wheel 9 by means of a fork 11 integral with an axle $12^1$ belonging to the lever-pedal 12 provided with the counter-weight 14.

The members carried by the motor shaft 15 are the same as in the construction shown in Figs. 1 to 4 that is to say, the pinion 18 gearing with the wheel 31, the flywheel 30, the double coupling-sleeve 19, the worm 17 in engagement with the wheel 9. The fork 21 controlling the sliding of the sleeve 19, instead of being carried by the shaft 22 is now suspended at the end of this shaft of which the rotation is directly obtained by the working lever 24 which is rocked in one direction or the other in order to determine the coupling of the worm 17 or of the pinion 18, and of which the placing in the mean position, produces the uncoupling of one or the other of these two members. The lower end of the lever 24 is simply articulated at $24^1$ to the outer end of the shaft 22, Fig. 6 and this lever is still moved within the cage 36 provided with the notches for fixing the lever corresponding to the various positions of the members.

Below the shaft 22 and parallel with same is arranged a shaft $45^{11}$ and its end which projects inside the casing serves as axle to an angle lever of which the vertical arm 45 almost reaches the surface of the ring 47; the horizontal arm $45^1$ is above a stud $21^1$ projecting in front of the corresponding prong of the fork 21, as seen in Fig. 10.

The arrangement of this angle lever and the ring 47 with the inner groove 48 and outer pin $47^1$ forms automatic uncoupling means for the worm 17 and consequently of the members carried by the shaft 6.

The working is similar to that for the machine shown in Figs. 1 to 4 except as regards the automatic uncoupling mechanism which works in the following manner:—

When the molding has been effected the working lever 24 which was in desired position for coupling the sleeve 19 with the pinion 18 is altered in position and reversed in order that the said sleeve 19 may slide on the shaft 15 and engage the worm 17. The latter being set in rotation rotates the toothed wheel 9. If the operator at this moment keeps his foot pressed on the pedal 12, the counter-weight 14 is in the lifted position shown in Fig. 6 and the sleeve 10 is kept away from the teeth of the wheel 9, the latter therefore rotates loosely on the shaft 6 and no action is produced. But if the operator releases the pedal the counterweight 14 falls back and causes rotation of the shaft 12¹ as well as the rocking of the fork 11 which repels the sleeve 10 and puts into engagement with the wheel 9. The shaft 6 is then driven together with the pinions 7 which are integral therewith, which actuate the racks 8 to lift the movable bottom of the mould.

The rotation of the sleeve 10 does not drive the ring 47 so long as the pin 49 moves along the groove 48 but as soon as this pin abuts against the shoulder formed by the end of this groove it renders this ring integral with the sleeve. The result is that the said ring is driven at the speed of the shaft 6 and that at a given moment the pin 47¹ encounters the hanging end of the lever 45 and causes this to swing. The rocking of the said lever is transmitted by its horizontal arm 45 to the stud of the fork 21 and causes the rocking of the latter which in its turn determines the sliding of the double coupling sleeve 19 in the desired direction for uncoupling the worm 17.

The ascent of the moulded object stops then immediately and this object can be removed with the movable bottom of the mould which serves it as support. A new bottom is then placed in the mould and the operator at this moment presses his foot on the pedal 12 in order to disengage the sleeve 10 from the wheel 9. The shaft 6 and its uncoupled sleeve 10 affording only a slight resistance allow the racks to descend by gravity and resume their normal position as the rods which form them are not toothed at their upper part and they cannot descend lower than the position shown in Figs. 5 to 8.

The moulded objects having variable thicknesses, each mould which is fixed on the plate 35 of the piston 34 is of course of the desired height; the course of the racks 8 must therefore be regulated according to each dimension of mould in order that the movable bottom which supports the materials to be moulded may arrive exactly at the top of the mould at each operation of lifting out of the mould. This regulation is obtained either by replacing the ring 47 by a similar ring but in which the groove 48 is longer or shorter as the case may be, or by altering the position of the pin 49 on the periphery of the sleeve 10, for which purpose the plate 4 is removed and the said sleeve is lifted off the shaft 6, then the ring 47 is removed in order to allow the change of place of the pin 49 which is a screw, for instance, which is put in the desired hole of a series of holes provided in the sleeve. The ring 47 is in one or two parts or arranged in any other manner for being easily removed and replaced.

This ring is so placed that the pin 47¹ is at a given distance from the pin 49 of the sleeve, so that the latter drives the ring at a precise moment which is determined in order that this ring may perform such a portion of a revolution that the pin 47¹ meets the arm 45 of the uncoupling lever at the exact moment when the movable bottom of the mould rises above the top of this mould.

This grooved ring device is only necessary when the course of the racks requires a rotation of the shaft 6 greater than one revolution but when this course does not necessitate a revolution of this shaft, the ring 47 is omitted and it suffices to fix a pin at a given point of the surface of the sleeve 10 in order that the angled lever 45, 45¹ may be actuated at the desired moment.

The modification shown in Figs. 12 and 13 is for the purpose of applying the machine to the rapid formation of foundry moulds.

The cylinder 1 in which the piston 34 slides is heightened to a certain extent as shown at 1ᵃ the length of the piston being similarly increased. The top part of the piston projects out of the cylinder, as previously, in order to form a plate 35, which receives, for the new use of the machine, a plate $d$ to which is fixed the model $e$. This plate is provided with three or four equidistant radial slots 35².

On the top of the racks 8 is a crown-wheel $a$ which is also provided with equidistant radial slots $a^1$ similar to those 35². To this crown-wheel are fastened rods $b$ by means of sliding members $c$. This fastening is effected by means of bolts $i$ passing through the slots $a^1$ and maintaining the members $c$ pressed against the upper surface of the crown $a$.

The crown $a$ normally rests on the shoulder formed by the top of the cylinder 1 and it surrounds the lower part of the extension 1ᵃ as shown in Fig. 1. The length of the rods $b$ is equivalent to the height of the extension 1ᵃ.

The formation of the foundry mould is obtained as follows:—

The model having been fastened to the plate 35, an ordinary casting-box $f$ is placed on the latter, then it is filled with sand $g$ up to the level of the top edge Fig. 1.

At this moment the operator actuates the lever 24 and puts it into the desired position in order that the sleeve 19 may enter into engagement with the pinion 18 and effect the coupling of the shaft 26 carrying the cam 29 of which the rotation produces the alternate raising and lowering of the piston 34 and its plate 35. It follows that the sudden falls of the latter cause the progressive settling of the sand $g$ which assumes exactly the form of the model $a$.

When the settling is judged to be sufficient, the operator again actuates the lever 24 in order to uncouple the shaft 26 and to couple the shaft 6 having the pinions 7 which gear with the racks 8. Consequently the said racks are drawn into an ascendent movement and raise the crown $a$ with its rods $b$. The upper end of the latter then engages in the slots $35^2$ of the plate 35 and comes into contact with the lower edge of the frame $f$, the latter is raised in its turn by the rods $b$ with the sand which it contains, as is shown in Fig. 13. The mould then bears exactly the impression of the model $e$ and it is removed to be conveyed to the drying.

At this moment the working lever is placed at the dead point in order to allow the racks and the crown $a$ to descend again to their position of rest, Fig. 12. A fresh frame is placed on the plate 35 and the same operations recommence for obtaining a fresh mould and so on.

The plate 35 has dimensions for receiving models of different sizes; the slots $35^2$ and $a^1$ enable the position of the rods $b$ to be regulated in accordance with these dimensions on which depend these of the frame $f$.

What I claim as my invention and desire to secure by Letters Patent of the United States is:—

1. The combination, in a machine for molding concrete, of a vertical cylindrical casing having a piston movable therewithin; a table on the upper part of said piston; means for adjusting the amplitude of movement of said piston; a shaft at the base of said piston; a roller loosely mounted on said shaft; a second shaft below the first-named shaft; a cam keyed thereon and coacting with said roller to rock said piston; a driving shaft parallel with the second-named shaft; a toothed wheel keyed on said second-named shaft; a pinion loosely mounted thereon and in mesh with said toothed wheel; a clutch member slidably keyed on said driving shaft and adapted to clutch either said pinion or a worm gear to said driving shaft; means for actuating said clutch member; racks on said table actuated by pinions; and means for actuating said table first by a rocking movement and then by elevating the racks.

2. The combination, in a machine for molding concrete of a vertical cylindrical casing having a piston movable therewithin, a table on the upper part of said piston, means for adjusting the amplitude of movement of said piston, a shaft at the base of said piston, a roller loosely mounted on said shaft, a second shaft below the first-named shaft, a cam keyed thereon and coacting with said roller to rock said piston, a driving shaft parallel with the second-named shaft, a toothed wheel keyed on said second-named shaft, a pinion loosely mounted thereon and in mesh with said toothed wheel, a clutch member slidably keyed on said driving shaft and adapted to clutch either said pinion or a worm gear to said driving shaft, a lever for actuating said clutch member, a cage having two notches, corresponding respectively to the engaged and disengaged positions of said clutch member, in which said lever can be engaged, racks on said table actuated by pinions, and means for actuating said table first by a rocking movement and then by elevating the racks.

In witness whereof I have signed this specification in the presence of two witnesses.

FRANÇOIS BONNET.

Witnesses:
GASTON JEAUNIAUX,
JULIAN KEMBLE SWEDBERG.